United States Patent [19]
Kreft

[11] Patent Number: 5,442,295
[45] Date of Patent: Aug. 15, 1995

[54] METHOD AND APPARATUS FOR INDICATING THE IMPROPER TERMINATION OF A CHIP CARD COMMUNICATION

[75] Inventor: Hans-Diedrich Kreft, Dassendorf, Germany

[73] Assignee: Angewandte Digital Electronik GmbH, Dassendorf, Germany

[21] Appl. No.: 213,085

[22] Filed: Mar. 15, 1994

[51] Int. Cl.⁶ .............................................. G01R 31/02
[52] U.S. Cl. .................................... 324/537; 324/513; 235/441; 235/492; 439/489
[58] Field of Search ............... 324/500, 513, 522, 537; 235/439, 441, 475, 476, 482, 492; 439/188, 489, 490

[56] References Cited

U.S. PATENT DOCUMENTS

| | | | |
|---|---|---|---|
| 4,675,516 | 6/1987 | Guion | 235/441 |
| 4,990,760 | 2/1991 | Tomari et al. | 235/492 |
| 5,285,433 | 2/1994 | Oshiba et al. | 235/476 X |

FOREIGN PATENT DOCUMENTS 2738113  3/1978  Germany .

*Primary Examiner*—Kenneth A. Wieder
*Assistant Examiner*—Glenn W. Brown
*Attorney, Agent, or Firm*—Hill, Steadman & Simpson

[57] ABSTRACT

A method and apparatus for indicating a removal of a chip card from a corresponding write/read device are disclosed. Cards which are unpredictably electrically separated from the write/read device can store the event in the card memory and use it as information for a restart.

14 Claims, 2 Drawing Sheets

METHOD AND APPARATUS FOR INDICATING THE IMPROPER TERMINATION OF A CHIP CARD COMMUNICATION

BACKGROUND OF THE INVENTION

Field of the Invention

The invention is directed generally to electronic chip cards and specifically to a method and apparatus for indicating an improper termination of a communication between a chip card and an associated write/read device.

Description of Prior Art

Modern data communications have been vastly improved, and chip cards are a specific example of such an advance. Chip cards (also referred to as "smart" cards meaning cards carrying a microprocessor and memory and perhaps additional circuitry) provide for data communication between a handheld small card and a write/read head terminal. Many uses exist for these cards, including automated banking, building access and security, etc. The chip cards are available with or without contacts. During a chip card communication, an interruption or fault can occur if the user improperly operates the device, for example.

A switch is included in the standard equipment of write/read devices for cards having contacts. When the cards are moved out of their final position, the contact terminals of the write/read device contacting the card surface must immediately separate electrically from the card so that no tracks are left on the card contacts, nor is any damage done to the card contacts (see FIG. 1a).

Given cards having contacts, an interruption of the power supply and, thus, an interruption of the faultless functioning of the card occurs immediately with a change of the switch. In practice, this leads to considerable problems since undefined information remains in the memory and makes a later use of the card more difficult and error-prone.

Chip cards that work in a contact-free manner acquire their energy by field transmission with coupling from electromagnetic oscillations. Rectifier circuits at the side of the chip cards are used in the operation of an electronic circuit. As a general rule, capacitors are utilized for charge storage in chip cards that work without contacts.

Write/read devices for cards without contacts also often have a limit switch to indicate a defined inserted position.

SUMMARY OF THE INVENTION

It is an object of the present invention to provide chip cards operating without contacts that use capacitors for maintaining operation when the card has been removed from the position of optimum energy transmission.

It is advantageous in the present invention to use chip cards that function without contacts (disclosed, for example, in U.S. Pat. Nos. 4,697,183 and 4,976,028 and in published German patent applications 27 38 113, 25 57 637, 34 02 737, 40 31 692, 35 44 689, and 39 35 364), since these already contain the suitable electronic components.

In cards working without contacts and wherein the card function (the card activity) is dependent on the time span during which adequate energy is transmitted contact-free to the card, this object is achieved by additionally lengthening the card function by using capacitors to provide uniform electrical supply on such cards.

In this way, cards without contacts embodying the present invention can also operate in a faultless, electronic manner when a switch indicates a modification of the card position.

The duration of the card function for cards without contacts can be utilized in the method and apparatus of the invention since the change of the switch position chronologically precedes the end of the card function, and the card is informed of the new switch position via the transmission path that continues functioning. For example, a processor on the card can account for and manage a defined transfer of the information using a software interrupt (a hardware interrupt is precluded because of the contact-free transmission). Thus, an uncontrolled termination of the card function is prevented.

Further, an inventive solution is disclosed wherein the change of the supply voltage on the card (see FIG. 3) serves as an indication for the interruption of the energy supply, and the card function is maintained via a capacitor until a defined termination of the card program occurs.

Additional features and advantages of the present invention are described in, and will be apparent from, the detailed description of the presently preferred embodiments and from the drawings.

DESCRIPTION OF THE PREFERRED EMBODIMENT

The geometrical relationships of the card condition in a write/read device 1 are symbolically shown in the figures.

Referring to the figures, chip card 10 represents a chip card having contacts and chip card 20 represents a chip card without contacts. As illustrated, a switch S1 indicates the position of the card in its ultimate switch position. S1 can take a mechanical, optical or any other desired form and indicates the optimum position for faultless energy transmission. In an embodiment, the switch position of S1 indicates a condition A or a condition B.

Figure 2A:
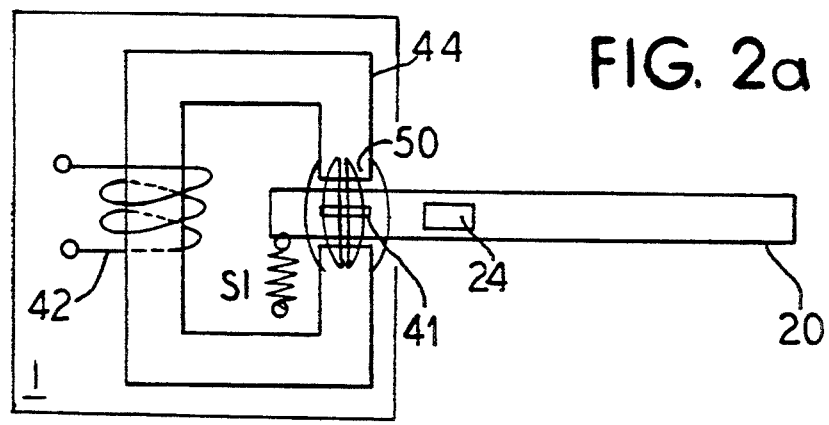
FIG. 2a shows an embodiment of the present invention wherein the card having a secondary coil is in Condition A.

As illustrated in FIG. 2a, a chip card 20 having a secondary coil 41 is located in an air gap with an electromagnetic alternating field and coupling 50 produced by the alternating voltage at a primary coil 42 with a ferrite core 44. The switch S1 indicates the position of the chip card 20 in condition A. In condition B shown in FIG. 2b, a different card position is indicated, and the position switch S1 has a different switch position. Thus, S1 indicates the physical position of the chip card 20. The switch position of S1 can be converted by the write/read device 1 into information that is transmitted to the card in a non-contacting manner, for example, according to U.S. Pat. No. 4,697,183. Such a non-contacting card is known in the art as a contactless chip card defined in ISO 10536 and sometimes called a contactless integrated circuit card, CICC. Initially during movement of the card from condition A to condition B, the card is still located in the influence of coupling 50. This influence on the coil 41 of the card decreases as the distance between the card and the coil increases. Due to the continuing but decreasing energy transmission, the electronics 24 on the card remain active during a time span. The continuing energy transmission is used to transmit the switch position change from the write/read device 1 to the card via the coupling or contactless transmission path 50.

Figure 2B:
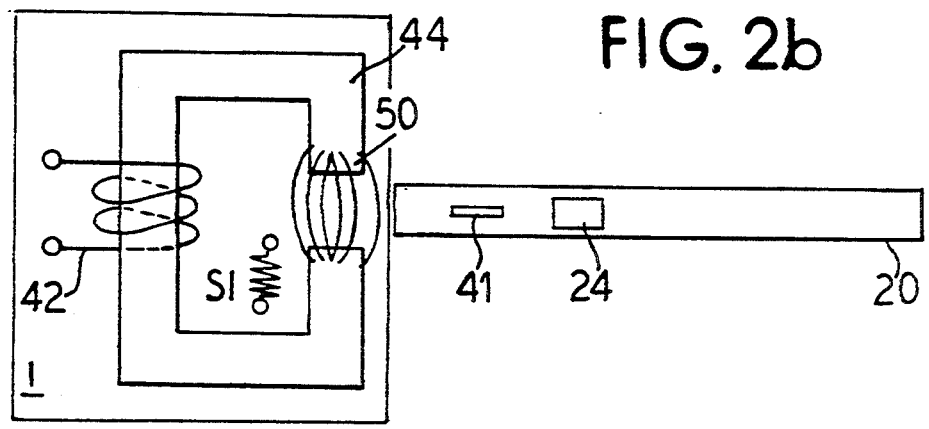
FIG. 2b shows an embodiment of the present invention wherein the card having a secondary coil is in Condition B.
Figure 3:
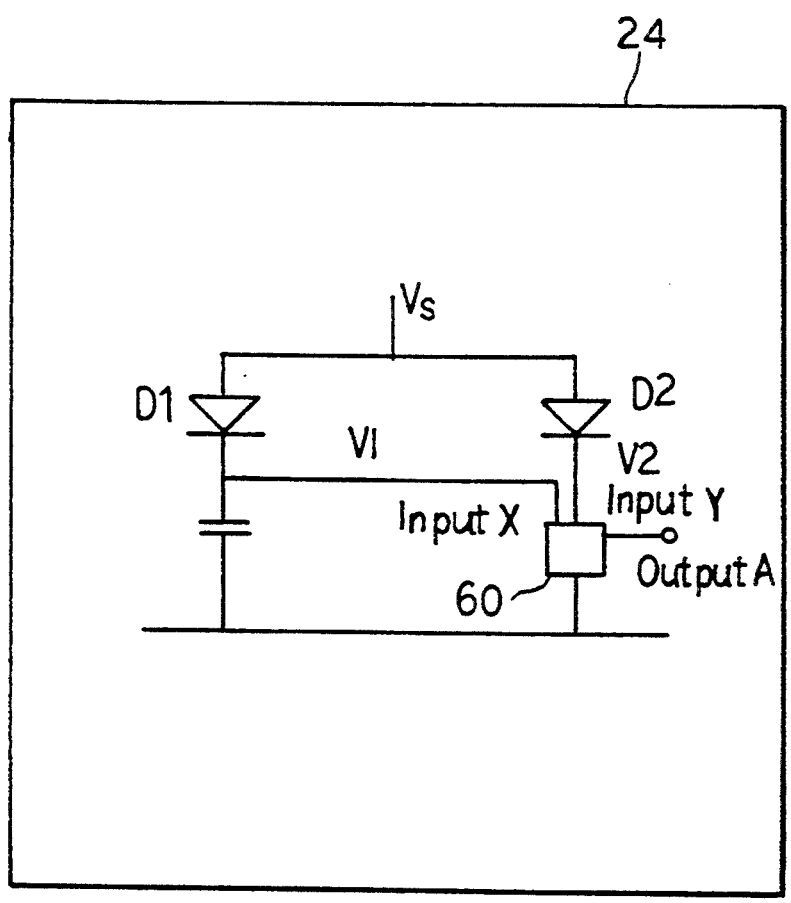
FIG. 3 shows a simplified schematic diagram of the card electronics of the present invention.

In a preferred embodiment of the present invention shown in FIG. 2b, the electronics 24 are located on the card 20, and an electronic recognition circuit 60 as shown in FIG. 3 is provided. The recognition circuit 60 receives information regarding the status of the input voltage via two inputs X and Y. The input Y is connected to the supply voltage $V_S$ and reacts extremely quickly to a voltage drop-off with V2. Input X is at a capacitor voltage V1 that discharges over a longer time than the time span in which the voltage V2 at input Y decreases. The voltage V1 of input X remains greater than the voltage V2 of input Y. A corresponding voltage difference can be evaluated and supplied to the output A. A hardware interrupt, which is transmitted to the write/read device 1, can be triggered via output A in the card electronics 24.

The diodes D1/D2 in FIG. 3 are used as separating diodes. However, other circuit arrangements could also be used.

The change signal at the output A on the card can be transmitted to the write/read device 1 and, combined with the status of the switch S1, can be utilized in the recognition circuit 60. The information for recognizing the positional change of the card is thus available both at the card as well as at the write/read device 1. The information can be used in a restart of the communication.

Figure 1A:
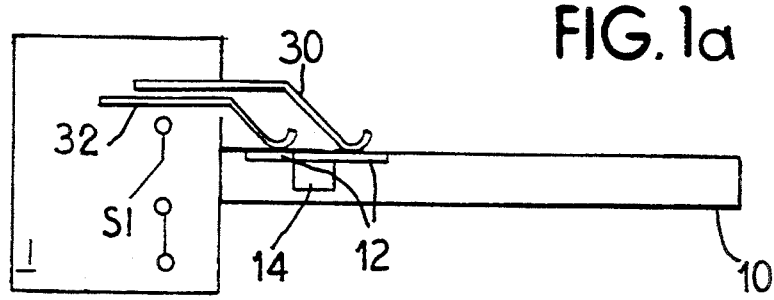
FIG. 1a shows a card having contacts in contact with contact terminals in the present invention.
Figure 1B:
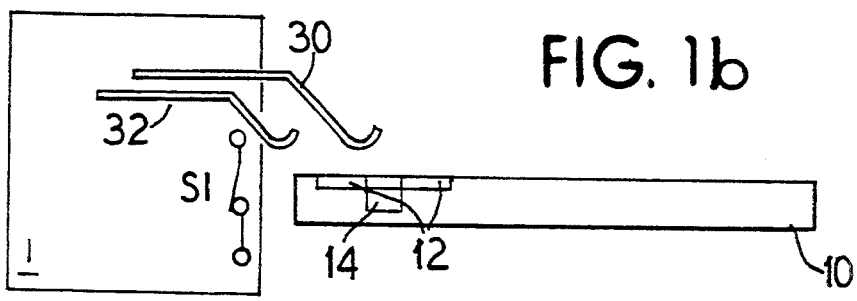
FIG. 1b shows a card having contacts not in contact with contact terminals in the present invention.

FIG. 1a shows a contact condition of a card having contacts. As illustrated, the write/read device 1 has contact terminals 30 and 32 connected to the supply voltage $V_S$ and ground, respectively. It may be seen that, given lift-off of the contact terminals 30 and 32 from the contact surfaces 12, the voltage supply of the card is immediately interrupted. Thus, the electronics of the card do not receive a defined termination. When the contact card has the electronics of a preferred embodiment, a defined termination given a sudden voltage drop-off can be accounted for.

Although other modifications and changes may be suggested by those skilled in the art, it is the intention of the inventor to embody within the patent warranted hereon all changes and modifications as reasonably and properly come within the scope of his contribution to the art.

I claim:

1. A method for detecting an interruption of an electrical communication between a chip card and a corresponding write/read device, comprising the steps of:
   providing a position detection means;
   detecting a first position of said card by using said position detection means;
   reporting said first position to said write/read device;
   detecting a second position of said card by using said position detection means;
   transmitting a change signal between said write/read device and said card, said signal corresponding to a change in said first card position relative to said second card position; and
   storing said change signal on said card, said change signal further being indicative of an interruption.

2. The method of claim 1, wherein said chip card is a chip card having contacts.

3. The method of claim 1, wherein said chip card is a contactless chip card constructed to operate without contacts.

4. A method of claim 1, further comprising the steps of:
   providing an electronic recognition circuit for evaluating a voltage difference, said voltage difference being a difference in voltage between an internally-generated capacitor voltage and a decrease in an externally-supplied voltage; and
   generating an output signal corresponding to said voltage difference, said output signal being indicative of a position detection.

5. A method of claim 1, wherein said transmitting step comprises transmitting said change signal from said card to said write/read device.

6. An electronic circuit apparatus for detecting an interruption of an electrical communication between a chip card and a corresponding write/read device, comprising:
   means for detecting a position of said card;
   means for reporting said position to said write/read device;
   means for transmitting a signal representing a change in said position from said write/read device to said card; and
   means for storing said change signal on said card, said change signal being indicative of an interruption.

7. An apparatus of claim 6, further comprising:
   means for evaluating a voltage difference, said voltage difference being evaluated between an internally-generated capacitor voltage and a decrease in an externally-supplied voltage; and
   means for generating an output signal corresponding to said voltage difference, said output signal being indicative of a position detection.

8. An apparatus of claim 6, wherein said chip card further comprises a chip card having contacts, said chip card further comprising an electronic recognition circuit with two inputs.

9. An apparatus of claim 6, wherein said chip card further comprises a contactless chip card having an electronic recognition circuit with two inputs.

10. An apparatus of claim 9, said card further comprising an electronic memory.

11. An apparatus of claim 10, said contactless card further comprising means for transmitting information to said write/read device before said interruption causes a complete loss of transmission.

12. An apparatus of claim 6, wherein said means for transmitting is an electromagnetic transmitter.

13. An apparatus of claim 6, wherein said means for detecting is a position switch.

14. An apparatus of claim 6, wherein said means for storing is an electronic memory.

* * * * *